(12) United States Patent
Phillips

(10) Patent No.: US 8,480,530 B2
(45) Date of Patent: *Jul. 9, 2013

(54) EIGHT AND NINE SPEED AUTOMATIC TRANSMISSIONS

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/372,012

(22) Filed: Feb. 13, 2012

(65) Prior Publication Data

US 2012/0142481 A1    Jun. 7, 2012

Related U.S. Application Data

(63) Continuation of application No. 12/047,431, filed on Mar. 13, 2008, now Pat. No. 8,113,977.

(60) Provisional application No. 60/979,687, filed on Oct. 12, 2007.

(51) Int. Cl.
  *F16H 37/02*    (2006.01)
  *F16H 3/44*    (2006.01)

(52) U.S. Cl.
  USPC ........... 475/210; 475/211; 475/212; 475/213; 475/218; 475/219; 475/302

(58) Field of Classification Search
  USPC ................ 475/210–213, 218, 219, 275–293, 475/295–297, 302, 311–313, 317–319, 323–325, 329, 330
  See application file for complete search history.

(56) References Cited

U.S. PATENT DOCUMENTS

| | | | |
|---|---|---|---|
| 5,342,258 A * | 8/1994 | Egyed | 475/281 |
| 5,471,892 A * | 12/1995 | Sherman | 74/325 |
| 5,743,824 A | 4/1998 | Park | |
| 5,755,637 A | 5/1998 | Park | |
| 6,176,803 B1 | 1/2001 | Meyer et al. | |
| 6,558,287 B2 | 5/2003 | Hayabuchi et al. | |
| 6,984,187 B2 | 1/2006 | Biermann | |
| 7,101,305 B2 | 9/2006 | Tabata et al. | |
| 7,163,484 B2 | 1/2007 | Klemen | |
| 7,198,586 B2 | 4/2007 | Brooks et al. | |
| 7,354,375 B2 | 4/2008 | Brooks et al. | |
| 8,113,977 B2 * | 2/2012 | Phillips | 475/210 |
| 2005/0090362 A1 | 4/2005 | Abe et al. | |
| 2006/0270513 A1 | 11/2006 | Klemen | |
| 2006/0270516 A1 | 11/2006 | Klemen | |
| 2009/0098974 A1 | 4/2009 | Phillips | |
| 2010/0210388 A1 | 8/2010 | Grochowski et al. | |

* cited by examiner

Primary Examiner — Tisha Lewis

(57) ABSTRACT

An automatic transmission includes four planetary gear sets, a plurality of friction and synchronizing clutches and two chain drive assemblies. Input torque is provided to four clutches which selectively provide torque to one element of a compound assembly comprising first and second planetary assemblies. The second planetary assembly includes only a sun gear and a planet carrier including elongate, stepped pinion gears which extend into the planet carrier of the adjacent first planetary assembly. The sun and ring gears of the first planetary assembly drive respective chain drive sprockets. A pair of chains transfer torque to respective driven chain sprockets. The chain driven by the first planetary assembly sun gear drives a third planetary assembly sun gear. The chain driven by the first planetary assembly ring gear drives a fourth planetary assembly sun gear. The transmission output is connected to the planet carriers of the third and fourth planetary assemblies.

31 Claims, 3 Drawing Sheets

| GEAR STATE | GEAR RATIO | RATIO STEP | CLUTCHING ELEMENTS ||||||||| 
|---|---|---|---|---|---|---|---|---|---|---|---|
| | | | 14 | 16 | 18 | 20 | 92 | 94 | 96 | 98 | 100 |
| REV | -6.040 | | X | | | | X | | X | | |
| N | | -1.34 | | | | | | | | | |
| 1ST | 4.500 | | X | | | | | | X | O | |
| 2ND | 3.315 | 1.36 | | X | | | | | X | X | |
| 3RD | 2.451 | 1.35 | | | X | | | | X | X | |
| 4TH | 1.830 | 1.34 | | | | X | | | X | O | |
| 5TH | 1.396 | 1.31 | | X | | | | | X | X | |
| 6TH | 1.050 | 1.33 | X | | | | | | | X | O |
| 7TH | 0.806 | 1.30 | | X | | | | | | X | X |
| 8TH | 0.628 | 1.28 | | | X | | | | | X | X |
| 9TH | 0.500 | 1.26 | | | | X | | | | O | X |

OVERALL RATIO: 9.00

X - ON, CARRYING TORQUE
O - ON, NOT CARRYING TORQUE

| GEAR STATE | GEAR RATIO | RATIO STEP | CLUTCHING ELEMENTS ||||||||| 
|---|---|---|---|---|---|---|---|---|---|---|---|
| | | | 14 | 16 | 18 | 20 | 92 | 94 | 96 | 98 | 100 |
| REV | -6.410 | | X | | | | X | | X | | |
| N | | -1.16 | | | | | | | | | |
| 1ST | 5.500 | | X | | | | | X | O | | |
| 2ND | 3.787 | 1.45 | | X | | | | X | X | | |
| 3RD | 2.646 | 1.43 | | | X | | | X | X | | |
| 4TH | 1.830 | 1.45 | | | | X | | | X | O | |
| 5TH | 1.300 | 1.41 | X | | | | | | | X | O |
| 6TH | 0.927 | 1.40 | | X | | | | | | X | X |
| 7TH | 0.678 | 1.37 | | | X | | | | | X | X |
| 8TH | 0.500 | 1.36 | | | | X | | | | O | X |

OVERALL RATIO: 11.00

X - ON, CARRYING TORQUE
O - ON, NOT CARRYING TORQUE

FIG. 5

EIGHT AND NINE SPEED AUTOMATIC TRANSMISSIONS

CROSS-REFERENCE TO RELATED APPLICATIONS

This application is a continuation of U.S. patent application Ser. No. 12/047,431 filed on Mar. 13, 2008 now U.S. Pat. No. 8,113,977, which claims priority to U.S. Provisional Patent Application No. 60/979,687, filed on Oct. 12, 2007, and as such, claims priority thereto under 35 U.S.C. §120.

FIELD

The present disclosure relates to automatic transmissions for a motor vehicle and more particularly to eight and nine speed automatic transmissions for motor vehicles having four planetary gear sets and a plurality of friction and synchronizer clutches.

BACKGROUND

The statements in this section merely provide background information related to the present disclosure and may or may not constitute prior art.

Many current passenger car multiple speed automatic transmissions include a combination of planetary gear sets and selectively engaged clutches and brakes which provide a plurality of forward torque or gear ratios.

Whereas three and four speed automatic transmissions were once commonplace and considered suitable to provide the requisite flexibility and performance, increasingly demanding economic and performance goals as well as consumer preference continue to encourage automatic transmission research and development. One result of this effort has been an increase in the number of available forward gears or speed ratios provided by the transmission. Six, seven and eight speed automatic transmissions are increasingly available.

Because they so closely match the power and torque curves of an engine to the vehicle speed and load, such six, seven and eight speed transmissions provide significant performance enhancements and fuel economies.

Study of these transmissions configurations, however, reveals that improvements are possible. For example, each of the selectively engaged frictional couplings, i.e., the clutches and the brakes, contribute to frictional losses, referred to as spin losses, when they are not engaged. Such spin losses are the result of relative rotation between the multiple, interleaved plates or discs of such devices. Two primary factors influence spin losses: the size or torque capacity of the clutch or brake and the speed difference across the clutch or brake. Reducing such spin losses therefore provides improved transmission efficiency which is highly desirable.

SUMMARY

The present invention provides an eight and a nine forward speed automatic transmission for a motor vehicle which includes four planetary gear sets, a plurality of friction and synchronizing clutches and two chain drive assemblies. The transmission is arranged along two parallel axes of rotation: a first axis defined by the input shaft and a second axis defined by the output shaft. The chain drive assemblies transfer power between sprockets disposed on the two axes. Alternatively, pairs of helical or spur gears may be utilized in place of the chain drive assemblies.

Input torque is provided commonly to four input clutches and, by engagement of one of four input clutches, to one element of a compound input gear assembly comprising a first planetary gear assembly and a second planetary gear assembly. The second planetary gear assembly includes only a sun gear and a planet gear carrier having a plurality of elongate, stepped pinion gears which extend into the planet gear carrier of the adjacent first planetary gear assembly. The sun gear and the ring gear of the first planetary gear assembly are coupled to a respective pair of chain drive sprockets disposed about the input axis. A pair of chains transfer torque to a respective pair of driven chain sprockets disposed on the output axis. The chain driven by the sun gear of the first planetary gear assembly directly drives a sun gear of a third planetary gear set that acts as a first sub-transmission. The chain driven by the ring gear of the first planetary gear assembly directly drives a sun gear of a fourth planetary gear assembly that acts as a second sub-transmission. The transmission output is commonly connected to and driven by a planet gear carrier of the third planetary gear assembly and a planet gear carrier of the fourth planetary gear assembly. Engagement of various combinations of the input clutches and a plurality of synchronizer clutches provides eight or nine forward speeds or gear ratios and a plurality of reverse speeds or gear ratios.

More particularly, the outputs of the four input clutches are connected to the sun gear and the ring gear of the first planetary gear assembly, the common planet gear carrier of the first and second planetary gear assemblies and the sun gear of the second planetary gear assembly and form an ordered set of speeds due to the gearset constraints. The ring gear of the first planetary gear assembly is connected to a first drive sprocket on the input axis which drives a chain which, in turn, drives a first driven chain sprocket on the output axis. The first driven sprocket is connected to the sun gear of the third planetary gear assembly the planet gear carrier of which is connected to the output shaft. A synchronizer clutch selectively connects the ring gear of the third planetary gear assembly to ground, providing a large mechanical advantage (underdrive), and another synchronizer clutch selectively connects the ring gear of the third planetary gear assembly to the sun gear of the third planetary gear assembly, providing direct drive. Together, the third planetary gear assembly and the two synchronizer clutches form a first two speed sub-transmission. Similarly, the sun gear of the first planetary gear assembly is connected to a second chain sprocket, second chain and second driven sprocket which drives a sun gear of a fourth planetary gear assembly. A pair of synchronizer clutches selectively connect the ring gear of the fourth planetary gear assembly either to ground or to the sun gear of the fourth planetary gear assembly. The fourth planetary gear assembly and the pair of synchronizer clutches form a second two speed sub-transmission. Thus, there are two torque paths between the input shaft and the output shaft through the two independent two speed sub-transmissions.

The gear ratios of the planetary gear assemblies and the ratios of the chain sprockets are chosen to provide the following "coarse" four speed ratio progression, in order of increasing speed ratio (decreasing mechanical advantage) through the first sub-transmission: input clutch to the sun gear of the first planetary gear assembly and the ring gear of the third planetary gear assembly grounded—underdrive; input clutch to the ring gear of the first planetary gear assembly and the ring gear of the third planetary gear assembly grounded—underdrive; input clutch to the sun gear of the first planetary gear assembly and the ring gear and the sun gear of the third planetary gear assembly connected together—overdrive; and input clutch to the ring gear of the first planetary gear assembly and the ring gear and the sun gear of the third planetary gear assembly connected together—overdrive.

There are two additional blended or virtual ratios available between each consecutive pair of "coarse" ratios by utilizing the two other input clutches which drive the common planet gear carrier of the first and second planetary gear assemblies and the sun gear of the second planetary gear assembly. This action is such that the torque ratios are interpolated according to the particular ratios of the planetary gear assemblies on the input shaft and the choice of the input clutch.

Thus, in addition to eight and nine speed operation, there is defined a ten speed progression that can be achieved with single transition, clutch-to-clutch shifts between the input clutches, with the synchronizer clutches changing ratios on the respective sub-transmissions only when all of the power and torque are being transmitted through the other sub-transmission.

Reverse ratios are achieved using a synchronizer clutch which grounds the planet gear carrier of the first planetary gear assembly. This causes the sun gears of the first and the second planetary gear assemblies to rotate backward if the input clutch associated with the ring gear of the first planetary gear assembly is applied, and the ring gear of the first planetary gear assembly to rotate backward if either of the input clutches associated with the sun gear of the first or the second planetary gear assembly is engaged. Thus, there are potentially six different reverse ratios that can be achieved: each of the input clutches associated with the sun and ring gear of the first planetary gear assembly and with the sun gear of the second planetary gear assembly can drive a two speed sub-transmission in a reverse direction.

In a first implementation of the present invention, the fifth forward ratio (the first interpolated ratio between underdrive through the ring gear of the first planetary gear assembly and direct drive through the sun gear of the first planetary gear assembly) is skipped in order to smooth out the ratio progression, providing a nine speed transmission having excellent ratio progression spanning an overall range of approximately 7:1 to 9:1.

In a second implementation of the present invention with slightly different planetary gear assembly and chain sprocket ratios, both fifth and sixth gear are skipped, providing a wider ratio eight speed transmission with a similarly smooth progression spanning an overall range of approximately 10:1 to 13:1.

In each implementation, there is a good two speed clutch-to-clutch reverse progression, with the lowest reverse gear offering at least as much mechanical advantage as first gear. Additionally, the lowest forward and lowest reverse gears are achieved by applying the same clutch. Thus, these transmissions form an ideal platform for so-called "friction launch" applications which eliminate the torque converter associated with traditional automatic transmissions.

It is thus an object of the present invention to provide an automatic transmission for motor vehicles which provides nine forward speeds.

It is a further object of the present invention to provide an automatic transmission for motor vehicles which provides eight forward speeds.

It is a still further object of the present invention to provide an automatic transmission for motor vehicles having an input shaft on a first axis and an output shaft on a second, offset, parallel axis.

It is a still further object of the present invention to provide an automatic transmission for motor vehicles having four planetary gear sets and a plurality of friction and synchronizer clutches.

It is a still further object of the present invention to provide an automatic transmission for motor vehicles having a pair of chain drives connecting components disposed about a pair of parallel, spaced apart axes.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. Like reference numbers in the various Figures consistently refer to the same element, component or feature.

Figures 3, 4:
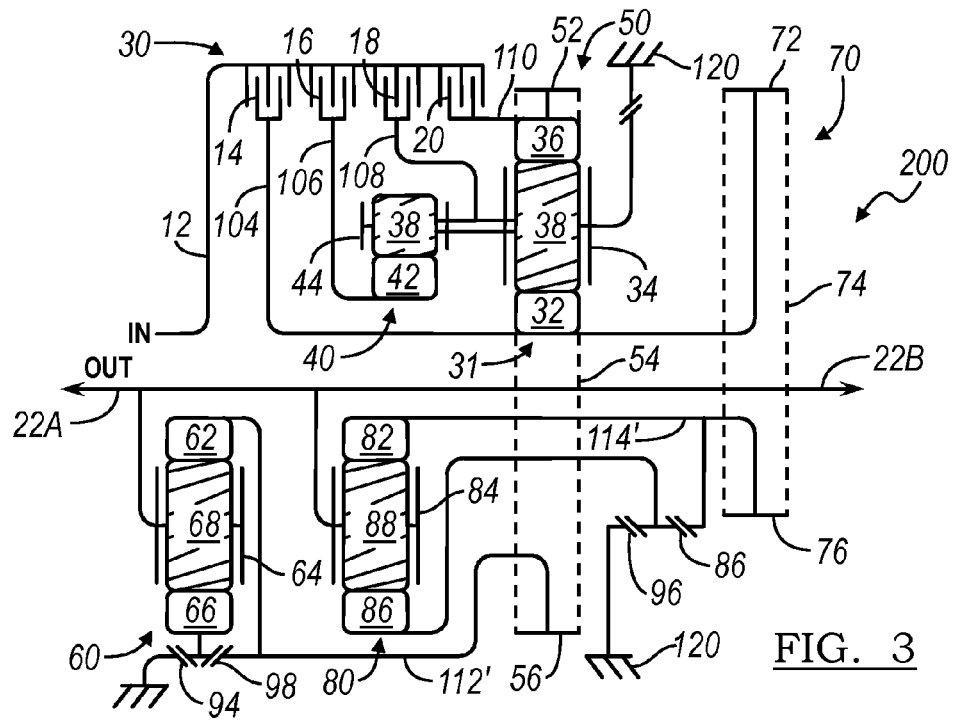
FIG. 3 is a diagrammatic view of a second embodiment of a nine speed automatic transmission according to the present invention.

FIG. 4 is a truth table presenting the various combinations of engaged clutches and brakes which achieve a given forward or reverse gear or speed ratio in the first and second embodiments of a nine speed automatic transmission according to the present invention; and FIG. 5 is a truth table presenting the various combinations of engaged clutches and brakes which achieve a given forward or reverse gear or speed ratio in the first and second embodiments of a eight speed automatic transmission according to the present invention;

DETAILED DESCRIPTION

The following description is merely exemplary in nature and is not intended to limit the present disclosure, application or uses.

Figure 1:
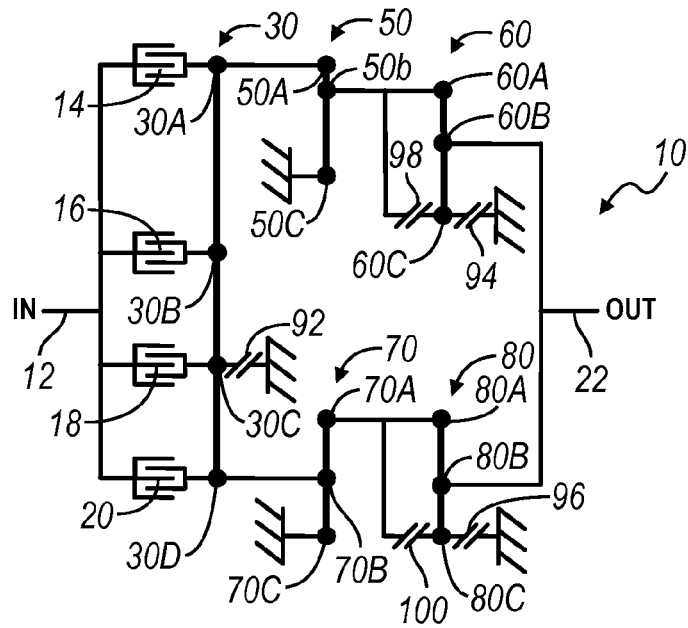
FIG. 1 is a lever diagram of a multiple speed automatic transmission according to the present invention.

Referring now to FIG. 1, a multiple, e.g., eight or nine, speed automatic transmission 10 according to the present invention is illustrated in a lever diagram. A lever diagram is a schematic representation of the components of an automatic transmission wherein certain components such as planetary gear and chain drive assemblies are represented by nodes. The relative lengths of the vertical bars between nodes of a given component represent the ratios between the components. Mechanical couplings or interconnections between the nodes of various components are illustrated by horizontal lines and torque transmitting devices such as friction clutches are represented by interleaved or nested fingers and synchronizer clutches by pairs of parallel, oblique lines. Further explanation of the format, purpose and use of lever diagrams can be found in SAE Paper No. 810102 entitled, "The Lever Analogy: A New Tool in Transmission Analysis" by Benford and Leising which is fully incorporated herein by reference.

The multiple speed automatic transmission 10 includes an input shaft 12 which is coupled to and directly and commonly drives a first friction clutch 14, a second friction clutch 16, a third friction clutch 18 and a fourth friction clutch 20. Drive torque from the transmission 10 is provided to an output shaft 22. The outputs of the clutches 14, 16 18 and 20 are coupled to a compound input gear assembly 30. The output of the first friction clutch 14 is coupled to a first node 30A of the compound input gear assembly 30, the output of the second friction clutch 16 is coupled to a second node 30B of the compound input gear assembly 30, the output of the third friction clutch 18 is coupled to a third node 30C of the compound input gear assembly 30 and the output of the fourth friction clutch 20 is coupled to a fourth node 30D of the compound input gear assembly 30.

The first node 30A of the compound input gear assembly 30 is coupled to a first node 50A of a first chain drive assembly 50 A second node 50B of the first chain drive assembly 50 is coupled the a first node 60A of a third planetary gear assembly 60. The third node 50C of the first chain drive assembly 50 is grounded. The fourth node 30D of the compound input gear assembly 30 is coupled to a second node 70B of a second chain drive assembly 70. A first node 70A of the second chain drive assembly 70 is coupled the a first node 80A of a fourth planetary gear assembly 80. The third node 70C of the second chain drive assembly 70 is grounded. A second node 60B of the third planetary gear assembly 60 and a second node 80B of the fourth planetary gear assembly 80 are coupled to the output shaft 22.

The third node 30C of the compound input gear assembly 30 is selectively connected to ground through a first synchronizer clutch 92. The third node 60C of the third planetary gear assembly 60 is selectively connected to ground through a second synchronizer clutch 94. The third node 80C of the fourth planetary gear assembly 80 is selectively connected to ground through a third synchronizer clutch 96. The second node 50B of the first chain drive assembly 50 and the first node 60A of the third planetary gear assembly 60 are selectively connected to the third node 60C of the third planetary gear assembly 60 through a fourth synchronizer clutch 98. Finally, the first node 70A of the second chain drive assembly 70 and the first node 80A of the fourth planetary gear assembly 80 are selectively connected to the third node 80C of the fourth planetary gear assembly 80 through a fifth synchronizer clutch 100.

Figure 2:
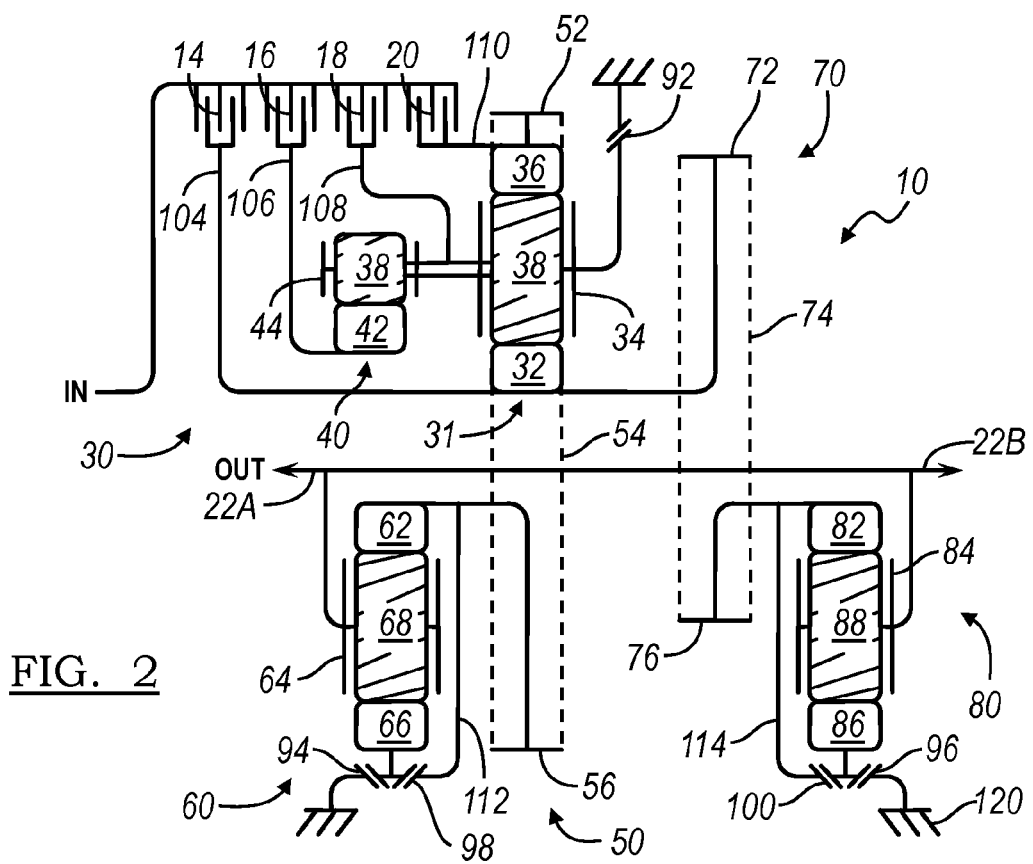
FIG. 2 is a diagrammatic view of a first embodiment of a nine speed automatic transmission according to the present invention.

With reference to FIG. 2, a first embodiment of a nine speed automatic transmission according to the present invention is illustrated and designated by the reference number 10. The automatic transmission 10 includes the input member or shaft 12 which is coupled to and driven by, for example, the output of an engine (not illustrated) or the turbine of a torque converter (not illustrated). The automatic transmission 10 also includes the output shaft 22 having first and second ends 22A and 22B. If the transmission 10 is longitudinally mounted in a vehicle, one of the ends 22A or 22B may be utilized to drive a final drive unit (not illustrated) in the front or rear of a vehicle or both may be utilized to drive final drive units in both the front and rear of a vehicle. Alternatively, if the transmission 10 is mounted transversely in a vehicle, either or both of the ends 22A and 22B may be utilized to provide drive torque to either or both sides of the vehicle.

The automatic transmission 10 also includes a first compound input gear set or assembly 30 disposed about the axis of the input shaft 12, a third, simple planetary gear set or assembly 60 disposed about the axis of the output shaft 22 and a fourth, simple planetary gear set or assembly 80 also disposed about the axis of the output shaft 22.

The first compound input gear assembly 30 includes a first, simple planetary gear assembly 31 having a first sun gear 32, a first planet gear carrier 34 and a first ring gear 36. Rotatably disposed in the first planet gear carrier 34 are a plurality of elongate, stepped first planet gears 38, one of which is illustrated in FIG. 2. Each of the plurality of first planet gears 38 is in constant mesh with the first sun gear 32 and the first ring gear 36, includes gear teeth of two different pitch diameters and extends out from the first planet gear carrier 34. The first compound input gear assembly 30 also includes a second, partial planetary gear assembly 40 having a second sun gear 42, a second planet gear carrier 44 and the ends of the plurality of first planet gears 38, one of which is illustrated in FIG. 2. There is no ring gear in the second planetary gear assembly 40. The first planet gear carrier 34 and the second planet gear carrier 44 are coupled and rotate together. Each of the plurality of first planet gears 38 is in constant mesh with the second sun gear 42. It should be appreciated that other gearing configurations may be utilized to achieve the operation of the first compound input gear assembly 30 other than the arrangement illustrated.

The third, simple planetary gear assembly 60 includes a third sun gear 62, a third planet gear carrier 64 and a third ring gear 66. Rotatably disposed in the third planet gear carrier 64 are a plurality of third planet gears 68, one of which is illustrated in FIG. 2. Each of the plurality of third planet gears 68 is in constant mesh with the third sun gear 62 and the third ring gear 66. The fourth, simple planetary gear assembly 80 includes a fourth sun gear 82, a fourth planet gear carrier 84 and a fourth ring gear 86. Rotatably disposed in the fourth planet gear carrier 84 are a plurality of fourth planet gears 88, one of which is illustrated in FIG. 2. Each of the plurality of fourth planet gears 88 is in constant mesh with the fourth sun gear 82 and the fourth ring gear 86.

The automatic transmission 10 also includes a first chain drive assembly 50 having a first drive chain sprocket 52 which is coupled to and driven directly by the first ring gear 36 of the first planetary gear assembly 31. The first chain drive sprocket 52 drives a first multiple link chain 54 and a first driven chain sprocket 56 disposed on the axis of the output shaft 22 and directly coupled to the third sun gear 62 of the third planetary gear assembly 60. Adjacent the first chain drive assembly 50 is a second chain drive assembly 70 having a second drive chain sprocket 72 which is coupled to and driven directly by the first sun gear 32 of the first planetary gear assembly 31. The second chain drive sprocket 72 drives a second multiple link chain 74 and a second driven chain sprocket 76 disposed on the axis of the output shaft 22 and directly coupled to the fourth sun gear 82 of the fourth planetary gear assembly 80.

It should be understood that the chain drive assemblies 50 and 70 of both the first embodiment of FIG. 2 and the second embodiment of FIG. 3 may be replaced with pairs of helical or spur gears. With such a change, of course, the rotation of the output shaft 22 would be "backward" or non-standard from conventional practice.

The automatic transmission 10 further includes a plurality of torque transmitting devices such as friction clutches and synchronizer clutches. As utilized herein, the term "friction clutch" refers to a torque transmitting device having first and second pluralities of interleaved friction plates or discs which are compressed by an associated operator or actuator and which is capable of carrying high levels of torque, i.e., the actual torque carried by the automatic transmission 10. On the other hand, a "synchronizer clutch," as utilized herein, refers to a torque transmitting device having a limited torque capacity synchronizer which is capable of carrying sufficient torque to overcome the inertia of an associated gear in order to synchronize it with a shaft and a positive clutch such as a dog clutch which engages to positively couple the gear and shaft and which is capable of carrying high levels of torque. Furthermore, it should be understood that while these devices are referred to as synchronizer clutches which suggests that they synchronize and connect two rotating members, three of the synchronizer clutches are, in fact, utilized as brakes, i.e., they slow and connect a rotatable member to a fixed or stationary member, thereby inhibiting rotation of the rotatable member.

In the following description, those synchronizer clutches functioning as brakes will be noted by the parenthetical addition of the word "brake."

It should also be appreciated that the use of the friction clutches and synchronizer clutches as herein described contributes to the low spin losses exhibited by the transmissions of the present invention. The friction clutches are of relatively low torque capacity and generally low slip speeds. Similarly, synchronizer clutches inherently have relatively low spin losses and their use in many locations in the transmissions of the present invention further reduces spin losses relative to other automatic transmission configurations.

The first high torque capacity friction clutch 14 having, as noted, interleaved pluralities of friction clutch plates or discs is operably disposed between and selectively connects the input shaft 12 to a first shaft, quill or concentric member 104 which is coupled to and drives the first sun gear 32 of the first planetary gear assembly 31 and the second drive chain sprocket 72 of the second chain drive assembly 70. The second high torque capacity friction clutch 16 is operably disposed between and selectively connects the input shaft 12 to a second shaft, quill or concentric member 106 which is coupled to and drives the second sun gear 42 of the second partial planetary gear assembly 40. The third high torque capacity friction clutch 18 is operably disposed between and selectively connects the input shaft 12 to a third shaft, quill or concentric member 108 which is coupled to and drives the first planet gear carrier 34 of the first planetary gear assembly 31 and the second planet gear carrier 44 of the second partial planetary gear assembly 40. The fourth high torque capacity friction clutch 20 is operably disposed between and selectively connects the input shaft 12 to a fourth shaft, quill or concentric member 110 which is coupled to and drives the first ring gear 36 of the first planetary gear assembly 31.

A first synchronizer clutch (brake) 92 having, as noted above, a synchronizer and positive clutch is operably disposed between and selectively connects or grounds the first planet gear carrier 34 of the first planetary gear assembly 31 to a stationary housing 120 of the automatic transmission 10. A second synchronizer clutch (brake) 94 is operably disposed between and selectively connects or grounds the third ring gear 66 of the third planetary gear assembly 60 to the stationary housing 120. A third synchronizer clutch (brake) 96 is operably disposed between and selectively connects or grounds the fourth ring gear 86 of the fourth planetary gear assembly 80 to the stationary housing 120.

A fourth synchronizer clutch 98 is operably disposed between and selectively connects the third ring gear 66 of the third planetary gear assembly 60 to a fifth shaft, quill or concentric member 112 which is coupled to the third sun gear 62 of the third planetary gear assembly 60 and the first driven chain sprocket 56 of the first chain drive assembly 50. A fifth synchronizer clutch 100 is operably disposed between and selectively connects the fourth ring gear 86 of the fourth planetary gear assembly 80 to a sixth shaft, quill or concentric member 114. The sixth shaft, quill or concentric member 114 is coupled to the fourth sun gear 82 of the fourth planetary gear assembly 80 and the second driven chain sprocket 76 of the second chain drive assembly 70.

As illustrated in FIG. 2, with the input shaft 12 to the left in the drawing, the left side represents the input or typically the front end of the automatic transmission 10. For various reasons, primarily related to packaging, it may be advantageous to arrange the components of the automatic transmission 10 differently than presented in FIG. 2. For example, locating the first and second chain drives 50 and 70 toward the rear of the transmission 10 and the third and fourth planetary gear assemblies 60 and 80 toward the front has the potential of reducing the size of the rear portion of the transmission housing 120. Such a configuration is illustrated in FIG. 3 as a second embodiment of the present invention.

Referring now to FIG. 3, the second embodiment of the multiple speed automatic transmission according to the present invention is illustrated and designated by the reference number 200. The input portion (the upper half of the drawings) of the second embodiment of the multiple speed automatic transmission 200 is identical to the corresponding portion of the first embodiment of the automatic transmission 10. As such, the second embodiment automatic transmission 200 includes the input shaft 12, the first friction clutch 14, the second friction clutch 16, the third friction clutch 18, the fourth friction clutch 20 and the output shaft 22 having the first end 22A and the second end 22B.

The automatic transmission 200 also includes the first compound input gear assembly 30 having the first, simple planetary gear assembly 31 including the first sun gear 32, the first planet gear carrier 34, the first ring gear 36 and the plurality of first elongate planet gears 38. Each of the first planet gears 38 is in constant mesh with the first sun gear 32 and the first ring gear 36, is axially elongated, includes gear teeth of two different pitch diameters and extends out from the first planet gear carrier 34. The first compound input gear assembly 30 also includes the second, partial planetary gear assembly 40 having the second sun gear 42 and the second planet gear carrier 44 which is coupled to and rotates with the first planet gear carrier 34. Rotatably disposed in the second planet gear carrier 44 are the ends of the plurality of first planet gears 38 of the first planet gear carrier 34. Each of the plurality of first planet gears 36 is in constant mesh with the second sun gear 42.

The second embodiment automatic transmission 200 also includes the first chain drive assembly 50 having the first drive chain sprocket 52. The first chain drive sprocket 52 drives the first multiple link chain 54 and the first driven chain sprocket 56. Adjacent the first chain drive assembly 50 is the second chain drive assembly 70 having the second drive chain sprocket 72. The second chain drive sprocket 72 drives the second multiple link chain 74 and the second driven chain sprocket 76.

As noted above, the output portion of the second embodiment automatic transmission 200 (the lower portion of the drawings) differs in layout, though not operation, from the first embodiment automatic transmission 10. The third planetary gear assembly 60 and the fourth planetary gear assembly 80 are disposed adjacent one another. The third, simple planetary gear assembly 60 includes the third sun gear 62, the third planet gear carrier 64 and the third ring gear 66. Rotatably disposed in the third planet gear carrier 64 are the plurality of third planet gears 68, one of which is illustrated in FIG. 3. The fourth, simple planetary gear assembly 80 includes the fourth sun gear 82, the fourth planet gear carrier 84 and the fourth ring gear 86. Rotatably disposed in the fourth planet gear carrier 84 are the plurality of fourth planet gears 88, one of which is illustrated in FIG. 3.

Adjacent the fourth planetary gear assembly 80 is the first chain drive assembly 50 described above. Adjacent the first chain drive assembly 50 and the rear of the automatic transmission 200 (the right side in FIG. 3) is the second chain drive assembly 70. The second embodiment automatic transmission 200 also includes the first synchronizer clutch (brake) 92, the second synchronizer clutch (brake) 94, the third synchronizer clutch (brake) 96, the fourth synchronizer clutch 98 and the fifth synchronizer clutch 100. Also present are the first shaft, quill or concentric member 104, the second shaft, quill or concentric member 106, the third shaft, quill or concentric member 108, the fourth shaft, quill or concentric member 110, a fifth shaft, quill or concentric member 112', a sixth shaft, quill or concentric member 114' and the housing 120.

Referring now to FIGS. 2, 3 and 4, the operation of both embodiments 10 and 200 of the nine speed automatic transmission will be described. It will be appreciated that the transmissions 10 and 200 are capable of transmitting torque from their input shafts 12 to their output shafts 22 in at least nine forward speed, torque or gear ratios and multiple reverse speed, torque or gear ratios. Each forward or reverse gear ratio is attained by activation or engagement of various combinations of three of the clutches as will be explained below. FIG. 4 is a truth table which presents the various combinations of friction and synchronizer clutches that are activated or engaged to achieve the various forward and reverse gear ratios. Gear ratios and ratios steps are also provided although it should be understood that these numerical values are presented for purposes of example and illustration only and that such values may be adjusted over significant ranges to accommodate various applications and operational criteria of the automatic transmissions 10 and 200.

In neutral, none of the clutch elements are activated or engaged.

In reverse gear, denominated Rev, the first friction clutch 14, the first synchronizer clutch (brake) 92 and the third synchronizer clutch (brake) 96 are activated or engaged.

From neutral, first gear is achieved by activating or engaging the first friction clutch 14, the second synchronizer clutch (brake) 94 and the third synchronizer clutch (brake) 96. As noted by the "O" in FIG. 4, although the third synchronizer clutch (brake) 96 is engaged, it is not carrying torque.

Second gear is achieved by deactivating or disengaging the first friction clutch 14 and activating or engaging the second friction clutch 16 while maintaining engagement of the second synchronizer clutch (brake) 94 and the third synchronizer clutch (brake) 96. In second gear, the third synchronizer clutch (brake) 96 carries torque.

Third gear is achieved by deactivating or disengaging the second friction clutch 16, and activating or engaging the third friction clutch 18 while maintaining engagement of the second synchronizer clutch (brake) 94 and the third synchronizer clutch (brake) 96.

Fourth gear is achieved by deactivating or disengaging the third friction clutch 18 and the second synchronizer clutch (brake) 94 and activating or engaging the fourth friction clutch 20 and the fourth synchronizer clutch 98 while maintaining engagement of the third synchronizer clutch (brake) 96. Once again, although the fourth synchronizer clutch 98 is engaged, it is not carrying torque.

Fifth gear is achieved by deactivating or disengaging the fourth friction clutch 20 and activating or engaging the second friction clutch 16 while maintaining activation or engagement of the third synchronizer clutch (brake) 96 and the fourth synchronizer clutch 98.

Sixth gear is achieved by deactivating or disengaging the second friction clutch 16 and the third synchronizer clutch (brake) 96 and activating or engaging the first friction clutch 14 and the fifth synchronizer clutch 100 while maintaining activation or engagement of the fourth synchronizer clutch 98. In sixth gear, the fifth synchronizer clutch 100 is not carrying torque.

The engagement of clutches in the remaining forward gears, seventh, eighth and ninth, is readily determined by reference to FIG. 4 and proceeds according to the steps described above and thus will not be further explained.

Referring now to FIG. 5, a truth table for a third embodiment of the present invention is presented. The gearing of the first and second embodiments 10 and 200 of the automatic transmission is such that it may be readily adapted to provide other shift configurations, e.g., eight or ten speed operation and operation with multiple reverse gears. The truth table of FIG. 5 provides a clutch engagement program having eight forward gears or speeds. Essentially, fifth gear of the truth table of FIG. 4 has been removed and the remaining higher speed gears, namely, sixth through ninth, now appear as and provide gears five through eight.

It will be appreciated that the foregoing explanations of the configuration, operation and gear states of the first and second embodiments 10 and 200 of the nine speed automatic transmission is wholly and accurately applicable to the configuration and operation of the third embodiment of the multiple speed transmission of the present invention. Furthermore, the explanation of operation assumes that all clutches not specifically referenced in a given gear ratio are inactive or disengaged. The explanation also assumes that during gear shifts between at least adjacent gear ratios, a clutch that is activated or engaged in both gear ratios will remain activated or engaged during the shift. Finally, the foregoing explanation assumes that downshifts follow essentially the opposite sequence of the corresponding up shifts and that several power on skip shifts, e.g., from first to third, are possible.

The description of the invention is merely exemplary in nature and variations that do not depart from the gist of the invention are intended to be within the scope of the invention. Such variations are not to be regarded as a departure from the spirit and scope of the invention.

What is claimed is:

1. A multiple speed automatic transmission comprising:
an input member;
an output member;
a first compound planetary gear assembly including a first planetary gear assembly having first, second, and third members and a second gear assembly having first and second members;
a third and a fourth planetary gear assembly each having first, second, and third members;
a first and a second chain drive assembly each including a chain drive sprocket, a driven chain sprocket and a sprocket engaging chain;
a first connecting member continuously connecting the first planetary gear assembly and the chain drive sprocket of the second chain drive assembly;
a second connecting member continuously connected to the second gear assembly;
a third connecting member continuously connecting the first planetary gear assembly with the second member of the second gear assembly;
a fourth connecting member continuously connecting the first planetary gear assembly with the chain drive sprocket of the first chain drive assembly;
a fifth connecting member continuously connecting the driven chain sprocket of the first chain drive assembly with the third planetary gear assembly;
a sixth connecting member continuously connecting the driven chain sprocket of the second chain drive assembly with the fourth planetary gear assembly; and
a plurality of torque transmitting devices each selectively connecting one of the first, second, and third members of the planetary gear assemblies with one of another of the first, second, and third members of the planetary gear assemblies, a ground, and the input member, and wherein the output member is connected to the second member of the third planetary gear assembly and the second member of the fourth planetary gear assembly and the torque transmitting devices are engageable in combinations of three to establish at least eight forward gear ratios and one reverse gear ratio.

2. The multiple speed automatic transmission of claim 1 wherein the first connecting member connects the first member of the first planetary gear assembly and the chain drive sprocket of the second chain drive assembly.

3. The multiple speed automatic transmission of claim 2 wherein the second connecting member connects to the second member of the second gear assembly.

4. The multiple speed automatic transmission of claim 3 wherein the third connecting member connects the second member of the first planetary gear assembly with the second member of the second gear assembly.

5. The multiple speed automatic transmission of claim 4 wherein the fourth connecting member connects the third member of the first planetary gear assembly with the chain drive sprocket of the first chain drive assembly.

6. The multiple speed automatic transmission of claim 5 wherein the fifth connecting member connects the driven chain sprocket of the first chain drive assembly with first member of the third planetary gear assembly.

7. The multiple speed automatic transmission of claim 6 wherein the sixth connecting member connects the driven chain sprocket of the second chain drive assembly with first member of the fourth planetary gear assembly.

8. The multiple speed automatic transmission of claim 7 wherein a first of the plurality of torque transmitting mechanisms selectively connects the input member to the first member of the first planetary gear assembly, a second of the plurality of torque transmitting mechanisms selectively connects the input member to the first member of the second planetary gear assembly, a third of the plurality of torque transmitting mechanisms selectively connects the input member to the second member of the first planetary gear assembly and the second member of the second planetary gear assembly, a fourth of the plurality of torque transmitting mechanisms selectively connects the input member to the third member of the first planetary gear assembly, a fifth of the plurality of torque transmitting mechanisms selectively connects the third connecting member to the ground, a sixth of the plurality of torque transmitting mechanisms selectively connects the fifth connecting member to the third member of the third planetary gear assembly, a seventh torque transmitting mechanisms selectively connects the third member of the third planetary gear assembly to the ground, an eighth of the plurality of torque transmitting mechanisms selectively connects the sixth of the plurality of connecting member to the third member of the fourth planetary gear assembly, and a ninth of the plurality of torque transmitting mechanisms selectively connects the third member of the fourth planetary gear assembly to the ground.

9. The multiple speed automatic transmission of claim 1 wherein the first, second, third, and fourth of the plurality of torque transmitting mechanisms are friction clutches, the fifth, seventh, and ninth of the plurality of torque transmitting mechanisms are brakes, and the sixth and eighth of the plurality of torque transmitting mechanisms are synchronizers.

10. The multiple speed automatic transmission of claim 1 wherein the first members of the planetary gear assemblies are sun gear members, the second members of the planetary gear assemblies are carrier members, and the third members of the planetary gear assemblies are ring gear members.

11. The multiple speed automatic transmission of claim 1 wherein the ground is a transmission housing.

12. The multiple speed automatic transmission of claim 1 wherein the chain drive assemblies are disposed parallel to one another.

13. The multiple speed automatic transmission of claim 1 wherein the input member and the output member are parallel and spaced from one another.

14. A multiple speed automatic transmission comprising:
an input member;
an output member;
a first compound planetary gear assembly including a first planetary gear assembly having first, second, and third members and a second gear assembly having first and second members;
a third and a fourth planetary gear assembly each having first, second, and third members;
a first and a second chain drive assembly each including a chain drive sprocket, a driven chain sprocket and a sprocket engaging chain;
a plurality of connecting members each continuously connecting one of the first, second, and third members of the planetary gear assemblies with one of another of the first, second, and third members of the planetary gear assemblies and the sprockets; and
a first torque transmitting device selectively connecting the input member to the first member of the first planetary gear assembly;
a second torque transmitting device selectively connecting the input member to the first member of the second planetary gear assembly;
a third torque transmitting device selectively connecting the input member to the second member of the first planetary gear assembly and the second member of the second planetary gear assembly;
a fourth torque transmitting device selectively connecting the input member to the third member of the first planetary gear assembly;
a fifth torque transmitting device selectively connecting the second member of the first planetary gear assembly to the ground;
a sixth torque transmitting device selectively connecting the first member of the third planetary gear assembly to the third member of the third planetary gear assembly;
a seventh torque transmitting device selectively connecting the third member of the third planetary gear assembly to the ground;
an eighth torque transmitting device selectively connecting the first member of the fourth planetary gear assembly to the third member of the fourth planetary gear assembly; and
a ninth torque transmitting device selectively connecting the third member of the fourth planetary gear assembly to the ground, and
wherein the output member is connected to the second member of the third planetary gear assembly and the second member of the fourth planetary gear assembly and the torque transmitting devices are engageable in combinations of three to establish at least eight forward gear ratios and one reverse gear ratio.

15. The multiple speed automatic transmission of claim 14 wherein a first of the plurality of connecting members connects the first member of the first planetary gear assembly and the chain drive sprocket of the second chain drive assembly.

16. The multiple speed automatic transmission of claim 15 wherein a second of the plurality of connecting members connects to the second member of the second gear assembly.

17. The multiple speed automatic transmission of claim 16 wherein a third of the plurality of connecting members connects the second member of the first planetary gear assembly with the second member of the second gear assembly.

18. The multiple speed automatic transmission of claim 17 wherein a fourth of the plurality of connecting members connects the third member of the first planetary gear assembly with the chain drive sprocket of the first chain drive assembly.

19. The multiple speed automatic transmission of claim 18 wherein a fifth of the plurality of connecting members connects the driven chain sprocket of the first chain drive assembly with first member of the third planetary gear assembly.

20. The multiple speed automatic transmission of claim 19 wherein a sixth of the plurality of connecting members connects the driven chain sprocket of the second chain drive assembly with first member of the fourth planetary gear assembly.

21. The multiple speed automatic transmission of claim 14 wherein the first, second, third, and fourth of the plurality of torque transmitting mechanisms are friction clutches, the fifth, seventh, and ninth of the plurality of torque transmitting mechanisms are brakes, and the sixth and eighth of the plurality of torque transmitting mechanisms are synchronizers.

22. The multiple speed automatic transmission of claim 14 wherein the first members of the planetary gear assemblies are sun gear members, the second members of the planetary gear assemblies are carrier members, and the third members of the planetary gear assemblies are ring gear members.

23. The multiple speed automatic transmission of claim 14 wherein the ground is a transmission housing.

24. The multiple speed automatic transmission of claim 14 wherein the chain drive assemblies are disposed parallel to one another.

25. The multiple speed automatic transmission of claim 14 wherein the input member and the output member are parallel and spaced from one another.

26. A multiple speed automatic transmission comprising:
an input member;
an output member;
a first compound planetary gear assembly including a first planetary gear assembly having first, second, and third members and a second gear assembly having first and second members;
a third and a fourth planetary gear assembly each having first, second, and third members;
a first and a second chain drive assembly each including a chain drive sprocket, a driven chain sprocket and a sprocket engaging chain;
a first connecting member continuously connecting the first member of the first planetary gear assembly and the chain drive sprocket of the second chain drive assembly;
a second connecting member continuously connected to the second member of the second gear assembly;
a third connecting member continuously connecting the second member of the first planetary gear assembly with the second member of the second gear assembly;
a fourth connecting member continuously connecting the third member of the first planetary gear assembly with the chain drive sprocket of the first chain drive assembly;
a fifth connecting member continuously connecting the driven chain sprocket of the first chain drive assembly with first member of the third planetary gear assembly;
a sixth connecting member continuously connecting the driven chain sprocket of the second chain drive assembly with first member of the fourth planetary gear assembly;
a first torque transmitting device selectively connecting the input member to the first member of the first planetary gear assembly;
a second torque transmitting device selectively connecting the input member to the first member of the second planetary gear assembly;
a third torque transmitting device selectively connecting the input member to the second member of the first planetary gear assembly and the second member of the second planetary gear assembly;
a fourth torque transmitting device selectively connecting the input member to the third member of the first planetary gear assembly;
a fifth torque transmitting device selectively connecting the second member of the first planetary gear assembly to the ground;
a sixth torque transmitting device selectively connecting the first member of the third planetary gear assembly to the third member of the third planetary gear assembly;
a seventh torque transmitting device selectively connecting the third member of the third planetary gear assembly to the ground;
an eighth torque transmitting device selectively connecting the first member of the fourth planetary gear assembly to the third member of the fourth planetary gear assembly; and
a ninth torque transmitting device selectively connecting the third member of the fourth planetary gear assembly to the ground, and
wherein the output member is connected to the second member of the third planetary gear assembly and the second member of the fourth planetary gear assembly and the torque transmitting devices are engageable in combinations of three to establish at least eight forward gear ratios and one reverse gear ratio.

27. The multiple speed automatic transmission of claim 26 wherein the first, second, third, and fourth of the plurality of torque transmitting mechanisms are friction clutches, the fifth, seventh, and ninth of the plurality of torque transmitting mechanisms are brakes, and the sixth and eighth of the plurality of torque transmitting mechanisms are synchronizers.

28. The multiple speed automatic transmission of claim 26 wherein the first members of the planetary gear assemblies are sun gear members, the second members of the planetary gear assemblies are carrier members, and the third members of the planetary gear assemblies are ring gear members.

29. The multiple speed automatic transmission of claim 26 wherein the ground is a transmission housing.

30. The multiple speed automatic transmission of claim 26 wherein the chain drive assemblies are disposed parallel to one another.

31. The multiple speed automatic transmission of claim 26 wherein the input member and the output member are parallel and spaced from one another.

* * * * *